United States Patent [19]

Murray

[11] Patent Number: 5,433,850
[45] Date of Patent: Jul. 18, 1995

[54] ADAPTOR TO OPERATE A HONEY EXTRACTOR UTILIZING A POWER DRILL

[76] Inventor: Thomas P. Murray, 4063 Holborn Rd., RR#2 Queensville Ontario, Canada, L0G 1R0

[21] Appl. No.: 235,878

[22] Filed: May 2, 1994

[51] Int. Cl.⁶ ............................................. B01D 33/00
[52] U.S. Cl. .................. 210/361; 210/380 V; 210/512.1; 81/124.2; 81/176.2; 81/177.2; 403/348
[58] Field of Search .............. 210/360.1, 361, 368, 210/380.1, 512.1, 512.3; 81/124.2, 176.15, 176.2, 177.2; 403/348, 349

[56] References Cited

U.S. PATENT DOCUMENTS 3,011,646 12/1961 Boronkay ..................... 210/361
3,929,343 12/1975 Wanner et al. ................. 403/349
4,373,893 2/1983 Barber ........................ 264/117
4,818,157 4/1989 Kouvelis ...................... 81/125

*Primary Examiner*—Robert A. Dawson
*Assistant Examiner*—David Reifsnyder
*Attorney, Agent, or Firm*—Jane Parsons & Associates

[57] ABSTRACT

An adaptor for a honey extractor which is normally manually operable by hand cranking a drive shaft allows it to be operated by a power drill. The adaptor engages the drive shaft axially of the honey extractor after removal of the handle which is used fo manual operation to connect the drive shaft to a power drill. The adaptor is conveniently a socket to engage an end of the drive shaft, the socket having a prong for insertion in the chuck of a power drill.

5 Claims, 5 Drawing Sheets

ADAPTOR TO OPERATE A HONEY EXTRACTOR UTILIZING A POWER DRILL

BACKGROUND OF THE INVENTION

1. Field of the Invention

This invention relates to a device for use with a manually operable honey extractor of the centrifugal type to operate using power from an electric drill.

2. Acknowledgement of prior art

Honey extractors conventionally comprise a rotatable support to carry a number of frames of uncapped comb honey oriented such that rotation of the support produces centrifugal force on the honey to direct it out of the comb. The support is contained within a drum so that centrifuged honey is thrown against the wall of the drum to run down it and collect in the bottom of the drum. From here it may be drawn off by any convenient means such as a tap.

Honey extractors may be manually operable, hand cranked machines or they may be motorized. There tends to be a very large price differential between these alternatives such that motorized extractors may only be economically viable for large apiaries. The smaller apiaries, however, may have to rely on manually operated, hand cranked extractors. The labour involved in rotating the support to provide sufficient centrifugal force to extract the honey efficiently is quite arduous even when the support carries only two frames of honey at a time. For larger extractors the work is harder and there is a definite limit to the size of manual extractors due to the work level necessary.

It is known to provide accessories for electric drills having interchangeable drill bits to customize them for purposes other than drilling. Thus, for example, sanding and buffing attachments are well known. It is also known to provide tools engagable in the chuck of a power drill for various specialized purposes. For example, Nikolas in U.S. Pat. No. 5,048,378 describes and claims a tool utilisable with a power drill for faucet nut installation. Many other adaptors and accessories are known.

It is believed that most such adaptors and accessories are intended for purposes where a low torque is required initially. However, even a two frame honey extractor may need about 20 inch-lbs of torque to start rotating.

SUMMARY OF THE INVENTION

The present inventor addressed the problem of utilising an electric drill to power a normally hand cranked honey extractor. He surprisingly found that, in spite of the fact that high torque is required initially to start rotation of the heavy support and to accelerate it to centrifugal speeds, it is possible to utilize an electric drill to operate a normally hand cranked honey extractor.

According to the invention there is provided in combination a power drill having a chuck, an unmotorized honey extractor having a drive shaft and a adaptor between the drill and the drive shaft, the adaptor having one end engagable by the chuck and the other end engagable with the drive shaft.

BRIEF DESCRIPTION OF THE DRAWINGS

Embodiments of the invention will now be described by way of example with reference to the drawings, in which.

DETAILED DESCRIPTION OF A PREFERRED EMBODIMENT

Figure 1:
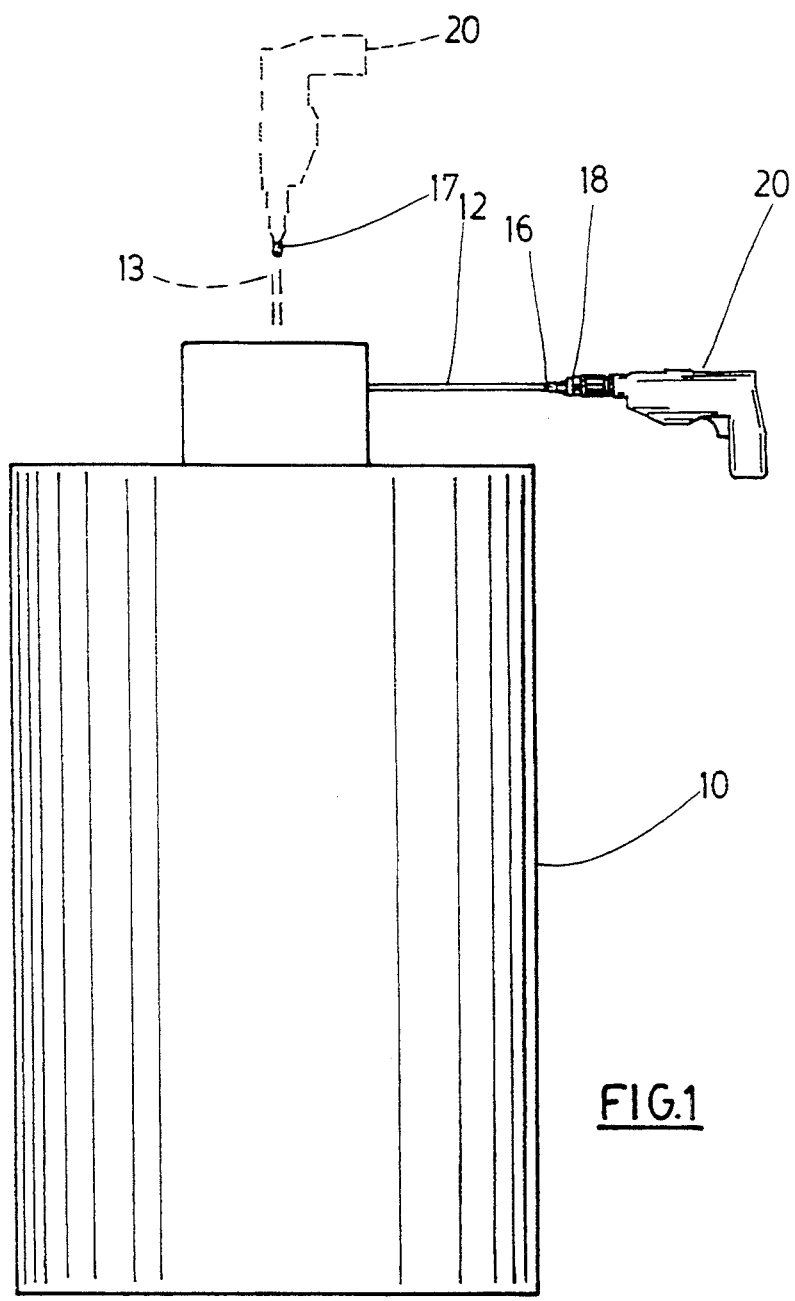
FIG. 1 shows schematically a combination of honey extractor and power drill according to the invention, an alternative combination being indicated by the drill shown in broken lines.

FIG. 1 shows a honey extractor 10 having a laterally extending drive shaft 12. The drive shaft 12 would, for conventional manual operation, be connected to a handle 14 (see FIG. 2) but, in an exemplary combination according to the invention, is connected through a adaptor 16 to the chuck 18 of a hand held power drill 20.

Manually operable honey extractors may have either a laterally extending drive shaft 12 shown in solid lines in FIG. 1, or they may have vertically extending drive shafts such as the drive shaft 13 shown in broken lines as an alternative in FIG. 1. The alternative vertical drive shaft 13 may be connected through adaptor 16 to chuck 18 of power drill 20. The alternative positions of adaptor 17 and drill 20 are shown in broken lines.

Figure 2:
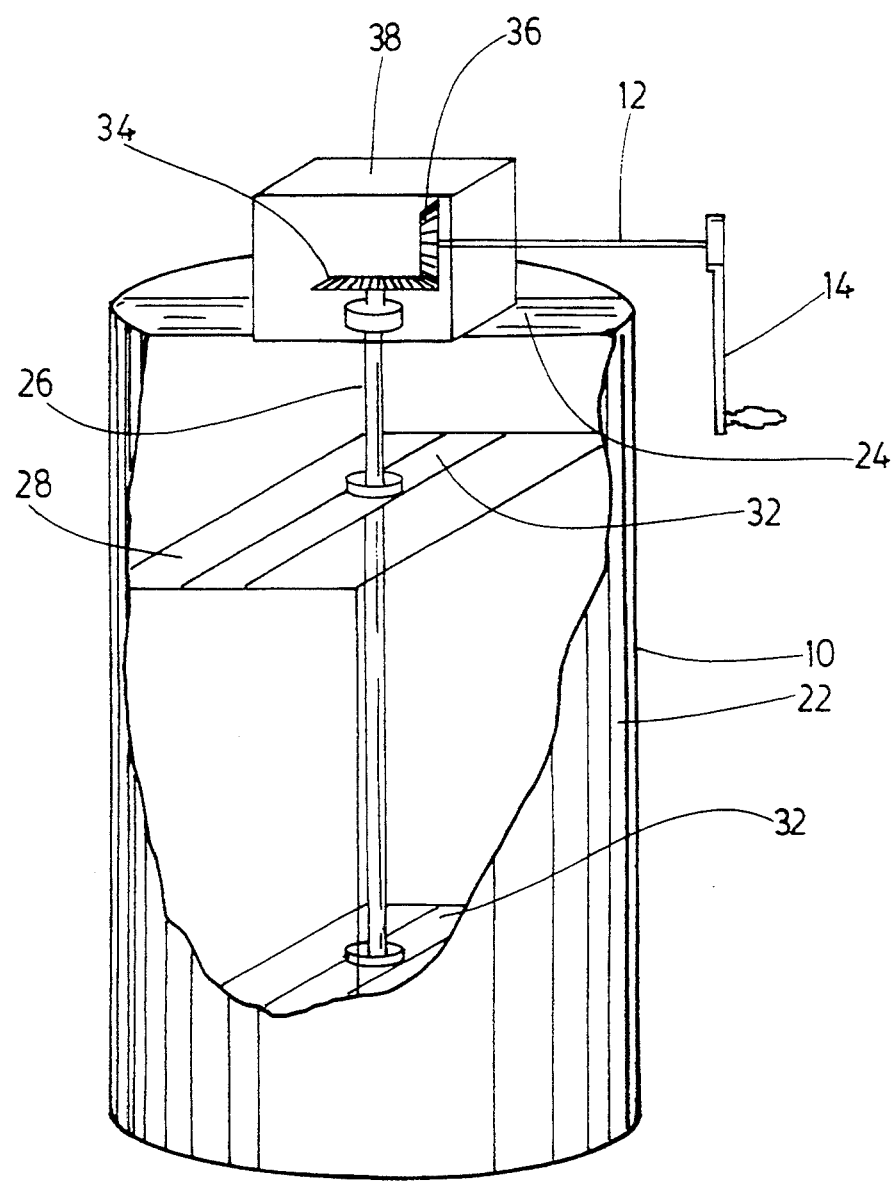
FIG. 2 shows a hand cranked honey extractor of the prior art having a drive shaft extending laterally.

FIG. 2 shows in more detail the honey extractor 10 of FIG. 1 having the laterally extending drive shaft 12. FIG. 2 represents the prior art in that a handle 14 is connected to the drive shaft 12 for manual operation. The honey extractor 10 may be of any conventional form. For example it may comprise a drum 22 having an open top giving access to rotatable means for carrying frames of honey. The drum 22 is illustrated with its cylindrical surface partially broken away to illustrate the interior. A rotatable, vertical, axial shaft 26 extends though a beam in bearings to allow its rotation. The shaft 26 extends into the drum sufficiently to carry support 28 for the honey frames. The support 28 may be of any conventional form, for example, an openwork cage. Support 28 is firmly arranged on shaft 26 to be rigid with it under the stresses of rotation when it is carrying heavy honey comb. As shown support 28 is fixed to shaft 26 by means of upper and lower struts 32.

The upper end of shaft 26 is geared to drive shaft 12 in any convenient manner. As shown, however, bevel gear 34 on the top end of shaft 26 is geared to bevel gear 36 on the inner end of drive shaft 12. The gear ratios will generally be those suitable for generation of sufficient centrifugal force for honey extraction by manual turning of handle 14. A housing or cover 38 may be provided for bevel gears 34, 36. This cover may be simple in form and of various configurations. It has been illustrated only very generally.

Figure 3:
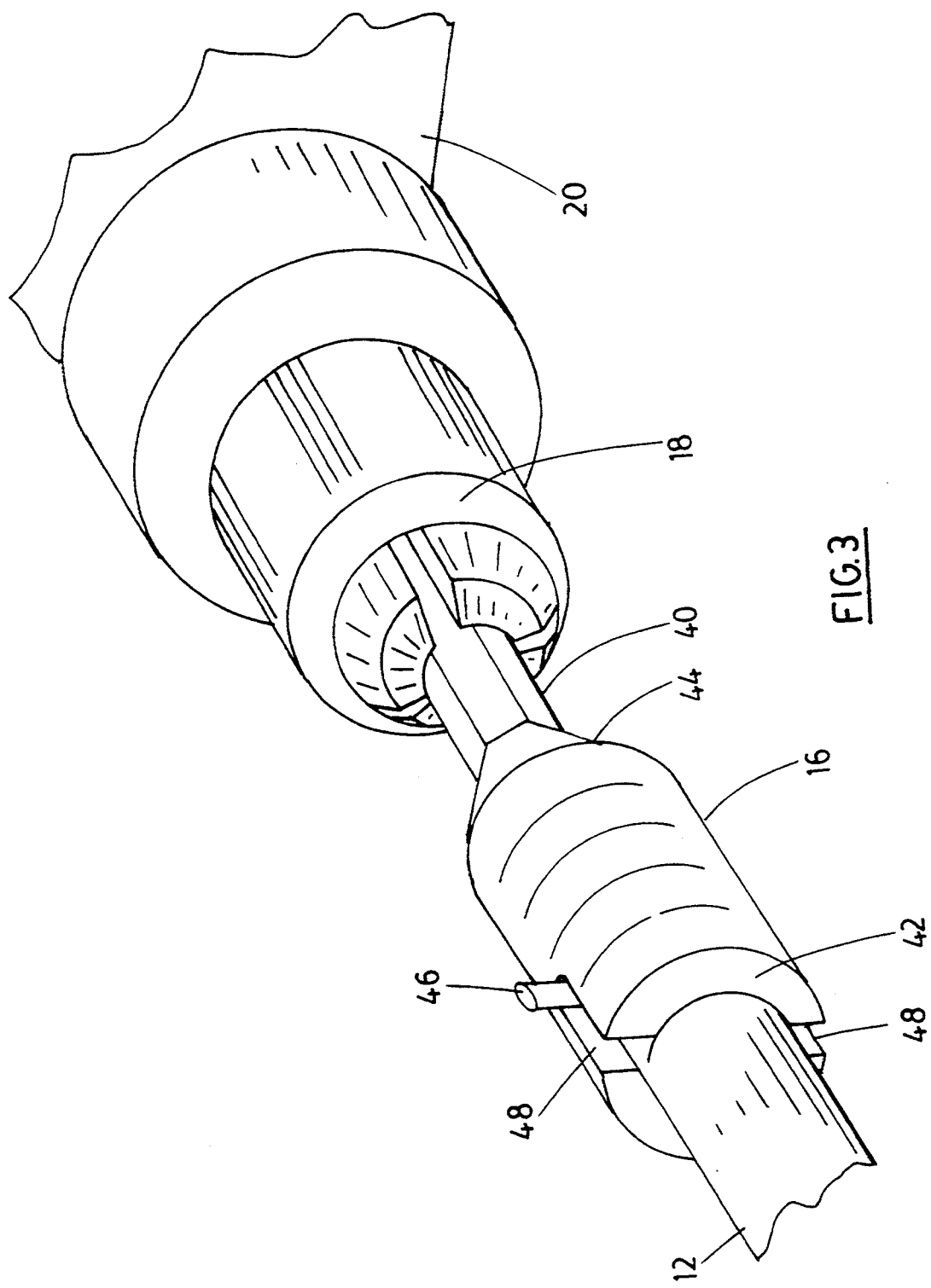
FIG. 3 shows a detail of the extractor of FIG. 2 adapted according to the invention in combination with a power drill.

In order to adapt honey extractor 10 for use with an electric drill 20, the handle 14 is removed and the drill 20 is connected through adaptor 16 as shown in FIG. 3.

Adaptor 16 comprises a drill end 40 and a socket end 42. The drill end 40 is adapted for insertion in chuck 18 of drill 20 and conveniently may comprise a prong of polygonal, e.g. hexagonal section, for effective gripping by chuck 18. Thus when the prong is of hexagonal section, flat surfaces may be presented to the chuck to obtain a positive grip.

The drill end 40 merges into socket end 42 through a tapered portion 44. It should be noted, however, that the shape of the portion between ends 40, 42 is not important. The ends may be joined by any means which is convenient and inexpensive in manufacture.

The socket end 42 is of a dimension that the socket will accept the end of drive shaft 12 from which handle 14 has been removed. Suitably the socket end 42 is provided with means to engage any engagement means on the drive shaft 12 which had been provided for holding the handle 14 against relative rotation with respect to the shaft. For example, as shown, drive shaft 12 may be provided with diametrically extending lugs 46 intended to engage slots on a handle engaging part. It is very suitable to provide the socket end 42 with slots 48 to engage lugs 46 to prevent the socket slipping over the driveshaft 12 when drill 20 is powered up.

Figure 4:
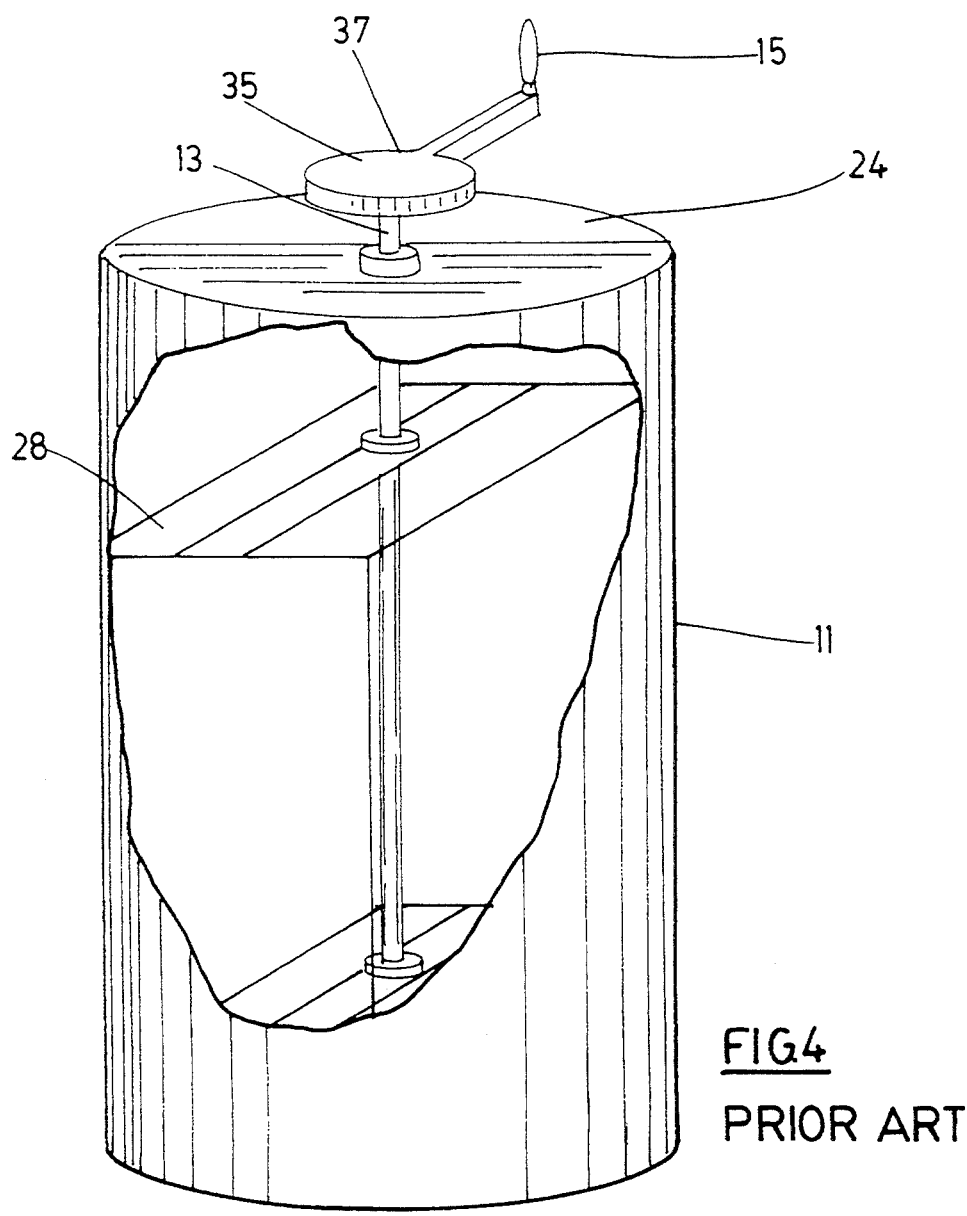
FIG. 4 shows a hand cranked honey extractor of the prior art having a vertically extending drive shaft.
Figure 5:
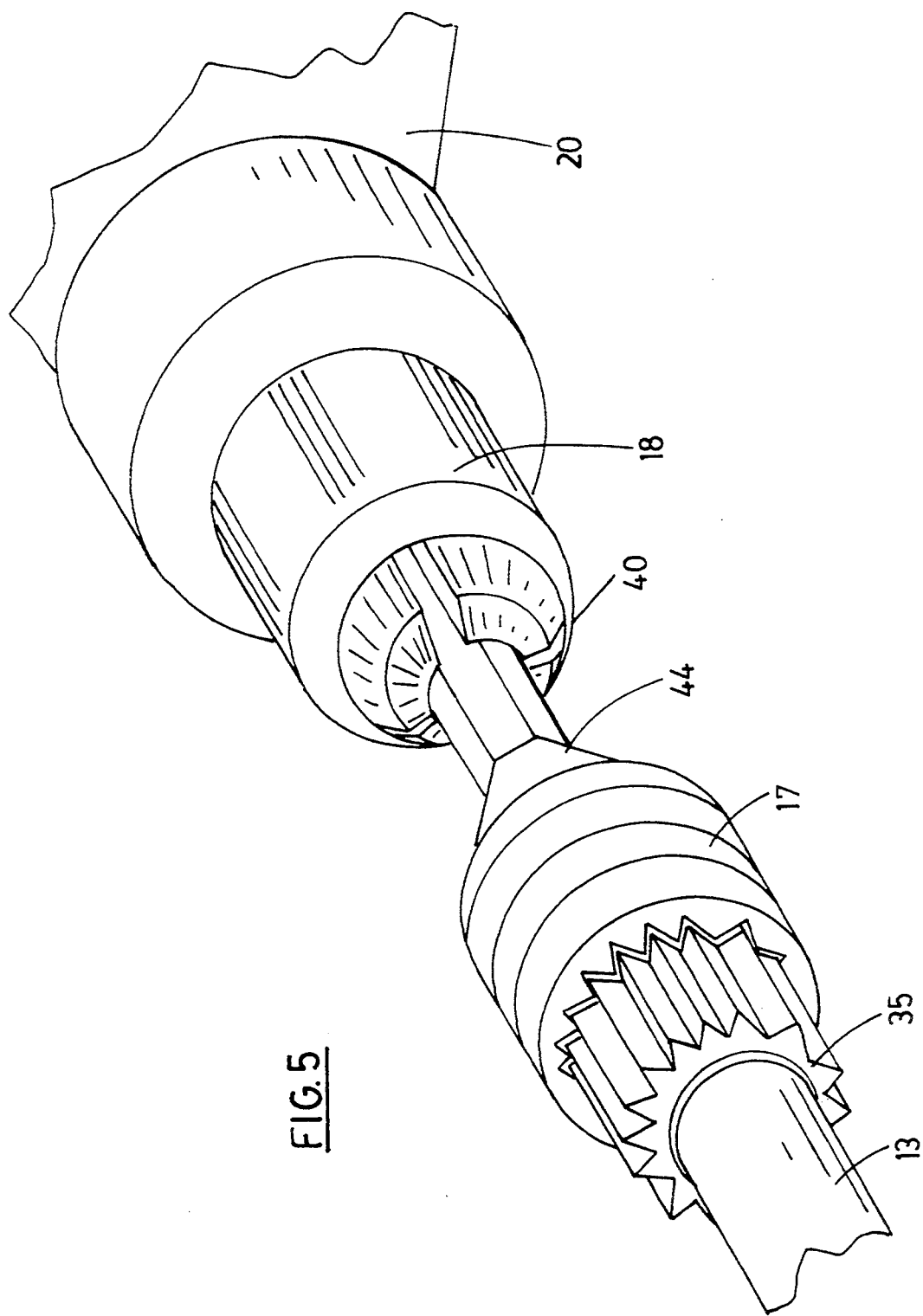
FIG. 5 shows a detail of the extractor of FIG. 4 adapted according to the invention in combination with a drill.

FIGS. 4 and 5 show a honey extractor 11 having a vertical drive shaft 13. Other parts of the extractor are similar to those of the extractor already described with reference to FIGS. 2 and 3 and are indicated by similar reference numerals. Drive shaft 13, although it may have a similar handle fitting to that described with reference to FIGS. 1 and 2, is illustrated with a different fitting. Drive shaft 13 has a splined gear wheel 35 at its top end. Gear wheel 35 meshes with an inner toothed surface of handle cap 37. Handle 15 extends from the cap 37.

To use a power drill to operate honey extractor 11, the handle cap 37 is removed and socket adaptor 17 is fitted in its place. Socket adaptor 17 is similar to socket adaptor 16 already described except that the inner surface of its socket is provided with teeth to mesh with gear wheel 35.

While adaptor 16 and adaptor 17 have been described with different socket fittings, a universal adaptor may be provided with both slots 48 and an inner toothed suface so that it may be used with either type of extractor. Alternatively, an intermediate fitting may be provided.

In use, once the drill 20 has been connected to the extractor through adaptor 16, 17, it is only necessary to power up the drill to operate the extractor. If the drill is a variable speed drill, the rotation of drive shaft 12, 13 may be started slowly and the speed increased as desired.

I claim:

1. In combination a power drill having a chuck, an unmotorized honey extractor having a drum within which is located a support for honey comb, the support being rotatable by a drive shaft, the combination also having an adaptor axially arranged between the drill and the drive shaft, the adaptor having one end engagable by the chuck and an other end engagable with the drive shaft.

2. The combination as claimed claim 1 in which said other end of the adaptor has an axial socket to engage an end of the drive shaft.

3. The combination as claimed in claim 2 in which said other end of the adaptor has at least one longitudinally extending slot to engage a lug provided on the drive shaft.

4. The combination as claimed in claim 2 in which the end of the drive shaft is externally toothed and said axial socket is internally toothed to engage the drive shaft.

5. The combination ad claimed in 1 in which said one end engagable by the chuck is of polygonal section.

* * * * *